United States Patent
Shim et al.

(10) Patent No.: US 9,239,780 B2
(45) Date of Patent: Jan. 19, 2016

(54) SELECTION OF MEMORY BLOCKS FOR GARBAGE COLLECTION BASED ON VARIABLE BLOCK LIFE THRESHOLD

(75) Inventors: Gyu-Dong Shim, Hwaseong-si (KR); Yang-Sup Lee, Hwaseong-si (KR); Won-Moon Cheon, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 159 days.

(21) Appl. No.: 13/613,443

(22) Filed: Sep. 13, 2012

(65) Prior Publication Data

US 2013/0166824 A1 Jun. 27, 2013

(30) Foreign Application Priority Data

Dec. 21, 2011 (KR) ........................ 10-2011-0139302

(51) Int. Cl.
*G06F 12/00* (2006.01)
*G06F 12/02* (2006.01)

(52) U.S. Cl.
CPC .... *G06F 12/0246* (2013.01); *G06F 2212/7205* (2013.01)

(58) Field of Classification Search
CPC ................ G06F 2212/7205; G06F 2212/7211
See application file for complete search history.

(56) References Cited

U.S. PATENT DOCUMENTS

| | | | |
|---|---|---|---|
| 5,933,840 A * | 8/1999 | Menon et al. | ................. 707/206 |
| 7,149,762 B1 | 12/2006 | Garthwaite | |
| 7,660,961 B2 | 2/2010 | Printezls et al. | |
| 2002/0129343 A1 | 9/2002 | Pinter et al. | |
| 2011/0029715 A1 | 2/2011 | Hu et al. | |
| 2012/0072683 A1* | 3/2012 | Iliadis | .......................... 711/159 |

FOREIGN PATENT DOCUMENTS

WO    WO 2011/061724 A1 *  5/2011  .............. G06F 13/00

OTHER PUBLICATIONS

Sohail et al. (Statistical Wear Leveling for PCM: Protecting Against the Worst Case Without Hurting the Common Case; Nov. 15, 2010; Purdue University e-Pubs—ECE Technical Reports).*

* cited by examiner

*Primary Examiner* — Reginald Bragdon
*Assistant Examiner* — Hannah A Faye-Joyner
(74) *Attorney, Agent, or Firm* — Volentine & Whitt, PLLC

(57) ABSTRACT

Memory blocks of a nonvolatile memory device are managed by identifying a full memory block, determining whether a block life of the full memory block exceeds a threshold value, and upon determining that the block life of the full memory block exceeds the threshold value, selecting the full memory block as a target block for garbage collection. The threshold of the block life is determined using an average write distance of logical pages programmed in the nonvolatile memory device.

18 Claims, 11 Drawing Sheets

[FREE BLOCK]   [OPEN BLOCK]

[FULL BLOCK]

FIG. 10

| FULL BLOCK | BLOCK LIFE |
|---|---|
| B1 | 2 |
| B2 | 4 |
| B3 | 7 |
| ⋮ | ⋮ |
| Bn | m |

SELECTION OF MEMORY BLOCKS FOR GARBAGE COLLECTION BASED ON VARIABLE BLOCK LIFE THRESHOLD

CROSS-REFERENCE TO RELATED APPLICATION

This application claims priority under 35 U.S.C. §119 to Korean Patent Application No. 10-2011-0139302 filed on Dec. 21, 2011, the subject matter of which is hereby incorporated by reference.

BACKGROUND OF THE INVENTION

The inventive concept relates generally to electronic memory technologies. More particularly, the inventive concept relates to management of memory blocks in nonvolatile memory devices.

Nonvolatile memory devices are widely used as storage media in applications ranging from personal electronics to industrial equipment. Nonvolatile memory devices retain stored data when disconnected from power, and they may also provide relatively high storage capacity and efficient performance.

Flash memory is a popular form of nonvolatile memory that can be found in a wide variety of electronic devices, with examples including portable electronics such as cellular phones, tablet computers, cameras, and memory fobs, as well as solid state drives and other mass data storage devices. In addition to providing relatively high storage capacity and efficient performance, flash memory can be electrically programmed and erased, and it may provide benefits of relatively low power consumption and an ability to withstand physical shock.

One potential drawback of flash memory and certain other forms of nonvolatile memory is that memory cells may not be overwritten without erasing an entire memory block (abbreviated as "block"). Accordingly, where a program operation is requested for an already programmed logical page, the corresponding physical page is typically invalidated, a new physical page (or physical address) is assigned to the logical page, and the requested program operation is carried out on the new physical page to store the logical page. Unfortunately, this can lead to a significant amount of unavailable memory space in the form of invalidated physical pages. As a result, garbage collection may be required on an occasional basis to free up some of the unavailable memory space.

In a typical garbage collection operation, a memory block having several invalid pages is freed up by moving all of its valid data to another memory block and then performing an erase operation on the memory block. A significant drawback of conventional garbage collection operations, however, is that they may require a significant amount of time, which can reduce the overall performance of a nonvolatile memory device. Consequently, there is a general need to reduce the amount of time required to perform garbage collection operations in nonvolatile memory devices.

SUMMARY OF THE INVENTION

In one embodiment of the inventive concept, a method of managing memory blocks in a nonvolatile memory device comprises identifying a full memory block among a plurality of memory blocks in the nonvolatile memory device, determining whether a block life of the full memory block exceeds a threshold value, and upon determining that the block life of the full memory block exceeds the threshold value, selecting the full memory block as a target block for garbage collection.

In another embodiment of the inventive concept, a system for managing memory blocks in a nonvolatile memory device comprises a target block selecting module that selects, as a target block, a full block having a block life greater than a threshold, and a block returning module that returns the target block selected by the target block selecting module as a free block.

In another embodiment of the inventive concept, a method of managing memory blocks in a nonvolatile memory device comprises selecting a memory block as a target block for garbage collection in consideration of a block life of the memory block and a number of pages stored in the memory block.

These and other embodiments of the inventive concept may potentially improve the performance of a nonvolatile memory device by shortening the time required for garbage collection.

BRIEF DESCRIPTION OF THE DRAWINGS

The drawings illustrate selected embodiments of the inventive concept. In the drawings, like reference numbers indicate like features.

FIGS. 8 to 10 are diagrams of a block management system for a nonvolatile memory device according to embodiments of the inventive concept.

DETAILED DESCRIPTION

Embodiments of the inventive concept are described below with reference to the accompanying drawings. These embodiments are presented as teaching examples and should not be construed to limit the scope of the inventive concept.

In the description that follows, the term "unit" or "module" may indicate, without limitation, a software and/or hardware component configured to perform certain tasks. Examples of such hardware include a field programmable gate array (FPGA) or an application specific integrated circuit (ASIC). Examples of a software unit or module may reside in an addressable storage medium, and they may be configured to execute on one or more processors. Further examples of a unit or module may include, without limitation, components such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units or modules may be combined into fewer components and units or modules or further separated into additional components and units or modules.

Unless defined otherwise, terms used herein have the same meaning as commonly understood by one of ordinary skill in the art. The use of any and all examples or terms in this description is intended merely to illuminate the inventive concept and is not to limit the scope of the inventive concept. Moreover, unless clearly indicated to the contrary, all terms defined in generally used dictionaries may not be interpreted in an overly formal sense.

Figure 1:
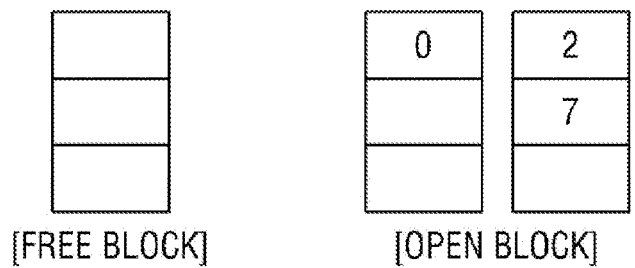
FIG. 1 illustrates various types of blocks that may be found in a nonvolatile memory device in accordance with certain embodiments of the inventive concept.
Figure 1:
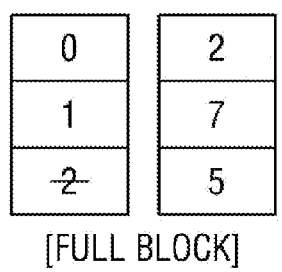

FIG. 1 illustrates various types of blocks that may be found in a nonvolatile memory device in accordance with certain embodiments of the inventive concept.

Referring to FIG. 1, the nonvolatile memory device may comprise, among other types of memory blocks, a free block, an open block, a full block. For explanation purposes, it will be assumed that each block in the nonvolatile memory device comprises three logical pages, although the inventive concept is not limited to this number of logical pages.

A free block is a block that does not store any logical pages. In a typical context, the nonvolatile memory device has the greatest number of free blocks when it is first used. Thereafter, as the device is used over time, the number of free blocks tends to decrease. Where the number of free blocks drops below a predetermined value, the nonvolatile memory device may generate new free blocks through garbage collection or other comparable management procedures.

An open block is a block that stores at least one logical page but does not store the maximum number of logical pages that can be in the block. For example, a left open block shown in FIG. 1 stores a logical page 0, and it can accommodate two additional logical pages. Similarly, a right open block shown in FIG. 1 stores logical pages 2 and 7, and it can accommodate one more logical page.

Where a logical page is input to the nonvolatile memory device from a host, the input logical page is generally stored in the open block. In some embodiments, although not shown in detail, the open blocks may be divided into a first block group storing logical pages that are frequently updated (i.e., a "hot" block group), and a second block group storing logical pages that are not frequently updated (i.e., a "cold" block group).

Where a logical page received from the host is frequently updated (i.e., it corresponds to hot data), the nonvolatile memory device stores the received logical page in an open block belonging to the first block group. On the other hand, where the received logical page is not frequently updated (i.e., it corresponds to cold data), the nonvolatile memory device stores the received logical page in an open block belonging to the second block group. Therefore, open blocks belonging to the first block group may remain in an open block state for a relatively short time compared to open blocks in the second block group.

A full block is a block storing a maximum number of logical pages. For example, in FIG. 1 full blocks each store three logical pages. Where a logical page (e.g., logical page 2) that is already stored in a full block is updated by the host, the logical page is invalidated within the full block and then corresponding new data is stored in an open block. In FIG. 1, a line drawn through logical page 2 indicates that logical page 2 in the full block has been invalidated.

Similar to open blocks, full blocks may be divided into groups. For example, if logical pages in a full block are frequently updated by the host, the full block may belong to the first block group (i.e., the hot block group), and if the logical pages in a full block are not frequently updated by the host, the full block may belong to the second block group (i.e., the cold block group).

Thus, logical pages in full blocks of the first block group tend to be frequently invalidated, and logical pages in full blocks of the second block group tend to remain as valid pages for a longer time.

Full blocks may also be divided into young blocks and old blocks. A young block is a full block whose block life does not exceed a threshold, and an old block is a full block whose block life exceeds the threshold. The block life represents a quantity of logical pages that have been written in the nonvolatile memory device from the time since a most recent logical page was written to fill the block. Accordingly, a full block that has been full throughout writing of many logical pages of the nonvolatile memory device will be considered an older block compared with a full block that has been full throughout writing of fewer logical pages.

Figure 2:
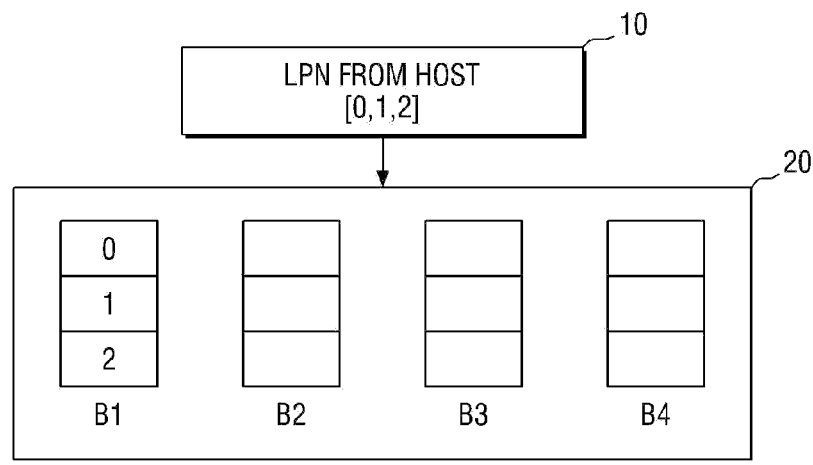
FIGS. 2 and 3 illustrate techniques for managing blocks in a nonvolatile memory device that has received a number of pages from a host.
Figure 3:
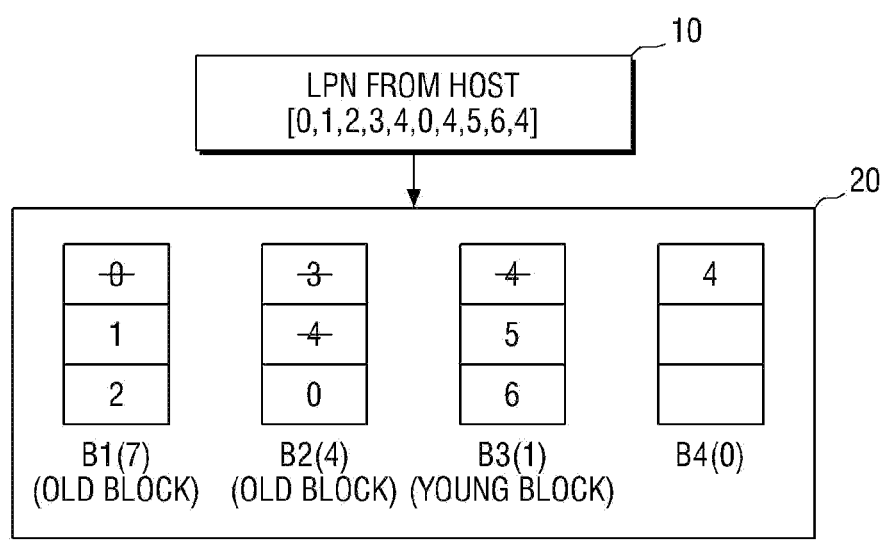

FIGS. 2 and 3 illustrate techniques for managing blocks in a nonvolatile memory device that has received a number of pages from a host.

Referring to FIG. 2, a memory system comprises a host 10 and a nonvolatile memory device 20. Initially, nonvolatile memory device 20 comprises four free blocks B1 through B4. Then, logical pages 0, 1 and 2 are sequentially input from host 10 to nonvolatile memory device 20, and the received logical pages are all stored in first free block B1, changing it to a first full block B1.

Referring to FIG. 3, subsequent logical pages 3, 4, 0, 4, 5, 6 and 4 are sequentially input from host 10 to nonvolatile memory device 20. Logical pages 3 and 4 are stored sequentially in second free block B2. Then, if logical page 0 is input, because logical page 0 is already stored in first full block B1, logical page 0 stored in first full block B1 is invalidated, and a logical page 0 having a new value is stored in second free block B2. The second free block B2 storing three logical pages becomes a second full block B2.

Subsequently input logical pages 4, 5, 6 and 4 are respectively stored in third free block B3 and fourth free block B4 through the same process. Accordingly, third free block B3 becomes a third full block B3, and fourth free block B4 becomes a fourth open block B4.

In the example of FIG. 3, third full block B3 is considered to be a young block B3 because it is a full block whose block life does not exceed a threshold, and first and second blocks B1 and B2 are considered to be old blocks B1 and B2 because their respective block lives exceed the threshold.

In the example of FIG. 3, the block life of first full block B1 is 7 because seven logical pages (logical pages 3, 4, 0, 4, 5, 6 and 4) have been stored in nonvolatile memory device 20 since first full block B1 became full. Similarly, the block life of the first full block B1 is 4 and the block life of the third full block B3 is 1. Further, a fourth open block B4 has not yet become a full block, so its block life is 0.

Supposing that the threshold of the block life is 3, the respective block lives of first full block B1 and second full block B2 exceed the threshold, and the block life of third full block B3 does not exceed the threshold. Thus, first full block B1 and second full block B2 are old blocks, and third full block B3 is a young block.

Nonvolatile memory device 20 performs garbage collection to ensure free blocks in the example of FIG. 3. The garbage collection can be performed as follows: (1) select a target block among the full blocks; (2) move valid logical pages stored in the target block to a free or open block, and (3) erase the target block and designate it as a free block.

In some types of garbage collection, during (1), a full block including a lowest number of valid logical pages is selected as the target block. In other words, (1) may be performed based on an invalid page count (IPC) y counting the number of invalid logical pages in each full block and selecting a full block including the most invalid logical pages as a target block. The reason for selecting such a full block as a target block is that the smallest number of valid logical pages are moved in (2), which can reduce the impact of garbage collection on the performance of nonvolatile memory device 20. Where the target block is selected in this manner in the example of FIG. 3, second full block B2 is selected as the target block.

In an alternative form of garbage collection assume third full block B3 is a full block belonging to the first block group (i.e., the hot block group), so the logical pages in third full block B3 are likely to be invalidated within a short period of time. That is, logical pages 5 and 6 are likely to be input from host 10.

Where logical pages 5 and 6 are input following the last logical page 4 input from host 10 as shown in FIG. 3, all logical pages in the third full block B3 are invalidated. Under these circumstances, if third full block B3 is selected as the target block of garbage collection, this may reduce the data movement cost compared to the case where second full block B2 is selected as the target block. In general, if the target block is a full block belonging to the first block group, all logical pages in the target block may be invalidated within a short period of time. However, if the target block is selected without waiting for all logical pages in the block to be invalidated, there may still be valid pages within the target block. Accordingly, it may be beneficial to wait a certain amount of time before selecting a young block as the target block. In other words, it may be beneficial to select the target block in consideration of both the block's group and also its block life.

Figure 4:
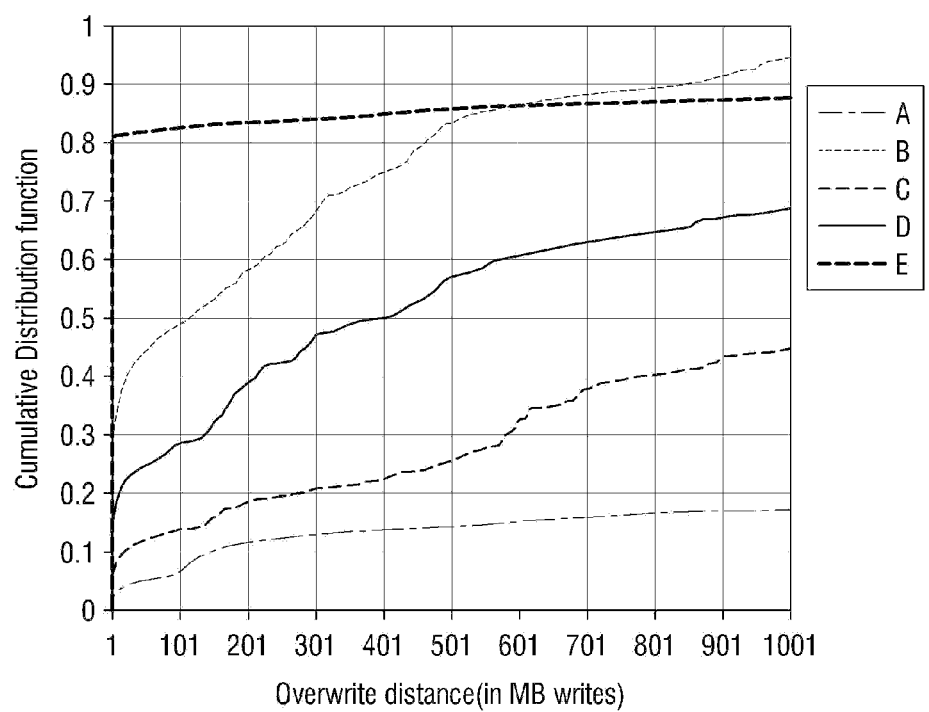
FIG. 4 is a graph illustrating a change in a number of rewrite operations in a nonvolatile memory device in various use environments.

FIG. 4 is a graph illustrating a change in a number of rewrite operations in a nonvolatile memory device in various use environments.

Referring to FIG. 4, a Y axis represents a probability value indicating how many blocks among the blocks in the nonvolatile memory device are rewritten, and an X axis represents a number of rewrite operations.

As indicated in the graph, in the use environment B, when there are about 110 rewrites in a unit of 1 MB in the nonvolatile memory device, about 50% of all blocks in the nonvolatile memory device are updated. On the other hand, in the use environment D, about 50% of all blocks in the nonvolatile memory device may be updated when there occur about 401 rewrites in a unit of 1 MB in the nonvolatile memory device. Further, in the use environment E, about 80% of all blocks in the nonvolatile memory device may be updated even though several rewrites occur in a unit of 1 MB.

Thus, because the first data (e.g., hot data) is mainly used in a specific use environment according to the use environments A to E, most of the data is rewritten in the nonvolatile memory device within a short period of time. In consideration of the data in FIG. 4, in specific use environments, before selecting the target block of garbage collection, young blocks should have sufficient time for their logical pages to become invalid in order to more efficiently perform garbage collection.

Figure 5:
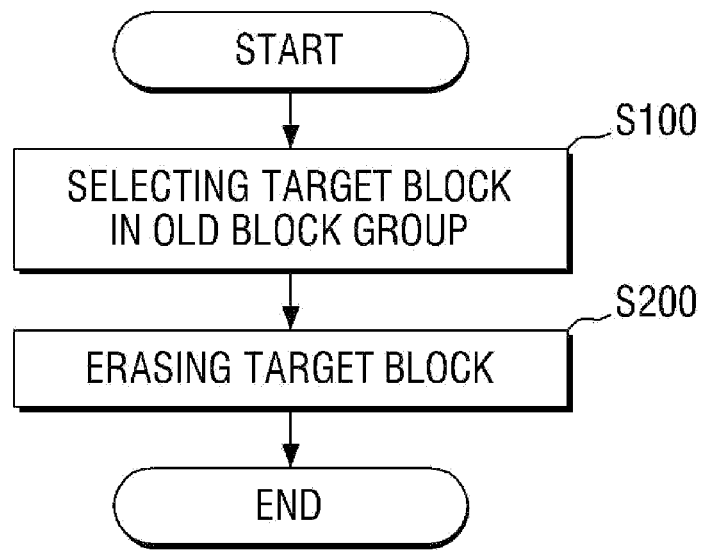
FIG. 5 is a flowchart illustrating a block management method for a nonvolatile memory device according to an embodiment of the inventive concept.
Figure 6:
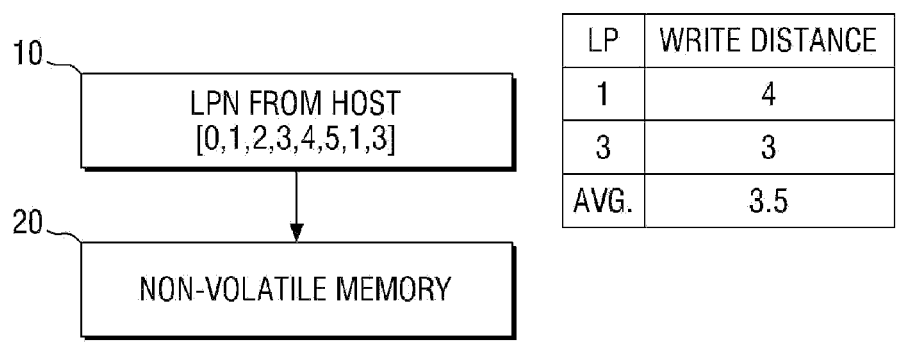
FIGS. 6 and 7 are diagrams illustrating alternative embodiments of the method of FIG. 5.
Figure 7:
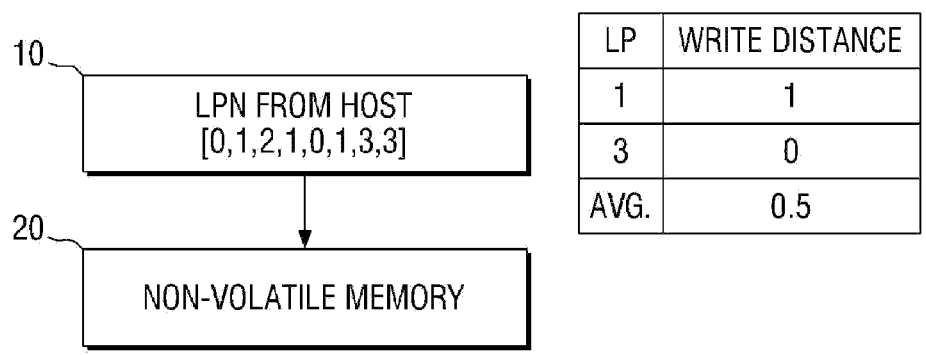

FIG. 5 is a flowchart illustrating a block management method for a nonvolatile memory device according to an embodiment of the inventive concept. FIGS. 6 and 7 are diagrams illustrating variations of the block management method of FIG. 5 according to embodiments of the inventive concept.

Referring to FIG. 5, among a number of full blocks in the nonvolatile memory device, a full block whose block life exceeds a threshold is selected as a target block (S100). In other words, the target block is selected among old blocks in order to allow young blocks to have sufficient time to invalidate logical pages stored therein.

In the example of FIG. 3, the predetermined threshold is set to 3. In general, the predetermined threshold can be set to any value, e.g., through a dynamic or static process. Examples of dynamic and static processes are presented below.

Dynamically setting the threshold of the block life typically comprises changing the threshold of the block life according to the logical pages provided to the nonvolatile memory device. For example, the threshold can be determined based on an average write distance of the logical pages written in the nonvolatile memory device. The write distance of the logical pages is an amount of the logical pages written in the nonvolatile memory device before a specific logical page is written again in the nonvolatile memory device after the specific logical page has been written in the nonvolatile memory device. For example, referring to FIG. 3, the write distance of logical page 0 is 4, and the write distance of logical page 4 is 1.

The average write distance of all logical pages written in nonvolatile memory device 20 from host 10 may be set as the threshold of the block life. Further, if necessary, the calculated average write distance may be set to have a margin of x % (x is a real number). The threshold of the block life calculated in this way may be changed according to the order or types of the logical pages provided to the nonvolatile memory device.

While a young block is not selected as the target block of garbage collection, a standby state is set for a period corresponding to the average write distance (or a value obtained by adding a margin of x % thereto) of the logical pages written in nonvolatile memory device 20. In this case, young blocks are allowed sufficient time for invalidation of the logical pages stored therein. Then, young blocks whose block life exceeds the threshold become old blocks, and the target block of garbage collection is selected among the old blocks. Accordingly, it is possible to reduce the total time required for garbage collection and also improve the performance of the nonvolatile memory device.

Meanwhile, if the write distances of all logical pages written in nonvolatile memory device 20 are taken into consideration to calculate the average write distance, it can take considerable time to calculate the average write distance. Accordingly, in some embodiments, some logical pages among the logical pages written in nonvolatile memory device 20 may be selected as sample logical pages, and the threshold of the block life may be set considering an average of the write distances of the selected sample logical pages.

Referring to FIG. 6, suppose that logical pages 0, 1, 2, 3, 4, 5, 1 and 3 are sequentially input to nonvolatile memory device 20 from host 10. Here, logical pages 1 and 3 may be selected as sample logical pages.

The write distance of logical page 1 is calculated to be 4. Further, the write distance of logical page 3 is calculated to be 3. Accordingly, the threshold of the block life in accordance with this embodiment is calculated to be 3.5, which is an average of the write distances of logical page 1 and logical page 3, or a value obtained by adding a margin of x % thereto. The threshold of the block life calculated in this way may be changed according to the logical pages provided to the nonvolatile memory device.

Referring to FIG. 7, unlike the example of FIG. 6, logical pages 0, 1, 2, 1, 0, 1, 3 and 3 are sequentially input to nonvolatile memory device 20 from host 10. In a similar manner, logical pages 1 and 3 may be selected as sample logical pages. In this example, the write distance of logical page 1 is calculated to be 1, and the write distance of logical page 3 is calculated to be 0. Accordingly, the threshold of the block life is calculated to be 0.5, which is an average of the write distances of logical page 1 and logical page 3, or a value obtained by adding a margin of x % thereto. That is, in this embodiment, the threshold of the block life is set dynamically according to the logical pages provided to nonvolatile memory device 20.

Meanwhile, the threshold of the block life calculated in this way cannot become indefinitely large. In the example of FIG. 7, if logical page 2 is selected as a sample page and logical page 2 is not input again to nonvolatile memory device 20 from host 10, theoretically, the threshold of the block life will become indefinite. Accordingly, there are only young blocks and there is no old block in nonvolatile memory device 20, which may cause an obstacle to selecting the target block for garbage collection.

To avoid this obstacle, the threshold of the block life may be determined in consideration of the amount of free blocks in nonvolatile memory device 20. That is, the threshold of the block life may be set as far as a predetermined amount or more of free blocks are present in nonvolatile memory device 20.

In the block management method as described above, a minimum threshold of the block life may be calculated by the following equation: Minimum threshold of block life=Average of write distances of sample logical pages * $(1+k)$, where $0 \leq k < 1$ and k is a real number.

In some embodiments, the minimum threshold of the block life is calculated in consideration of other parameters such as a median of the write distances of sample logical pages. Further, a maximum threshold of the block life may be calculated based on the amount of free blocks in nonvolatile memory device 20. That is, the maximum threshold of the block life may be an over-provisioning space of nonvolatile memory device 20.

This calculation may be expressed in an equation as follows: Average (or median) of write distances of sample logical pages * $(1+k)$<Threshold of block life<Over-provisioning space of the nonvolatile memory device, where $0 \leq k < 1$ and k is a real number.

Statically setting the threshold of the block life is typically accomplished by fixing the threshold of the block life regardless of the logical pages provided to the nonvolatile memory device. When using a static setting, the threshold of the block life may be determined according to the amount of free blocks in nonvolatile memory device 20. For example, the threshold of the block life may be set as follows: Threshold of the block life<Over-provisioning space of the nonvolatile memory device * a, where $0 \leq a < 1$ and a is a real number.

The threshold of the block life set in this way is not changed after "a" is determined. Accordingly, the threshold of the block life is not changed according to the logical pages provided to nonvolatile memory device 20.

Referring again to FIG. 5, the target block is returned as a free block (S200). Specifically, valid logical pages in the target block are moved to a free block or open block in nonvolatile memory device 20, and the target block is returned as a free block. Because this process may be the same as that of general garbage collection, a detailed description thereof will be omitted.

Figure 8:
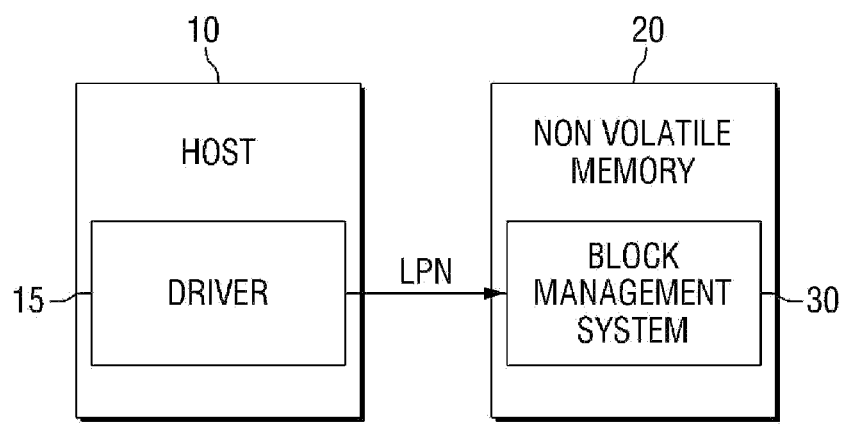
Figure 9:
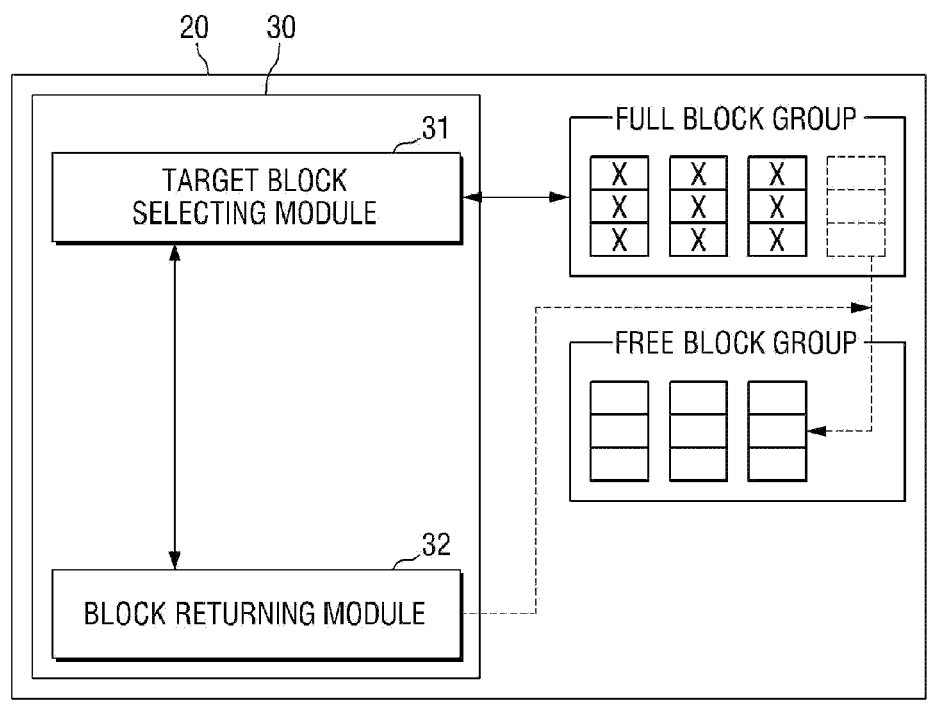
Figure 10:
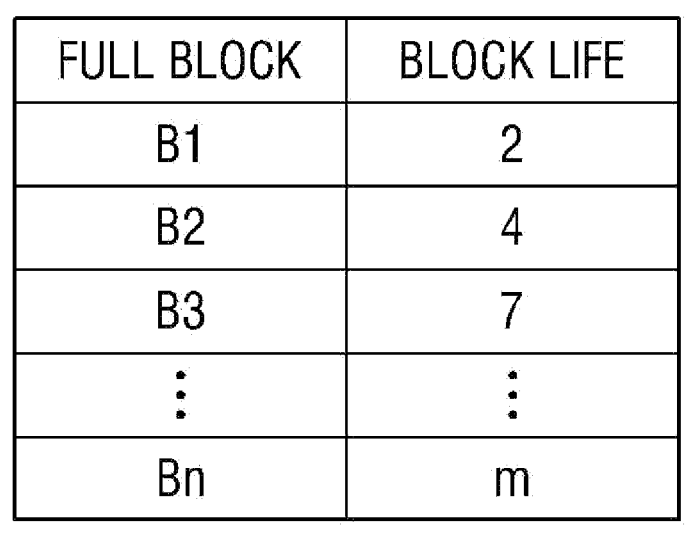

FIGS. 8 to 10 are diagrams for explaining a block management system of a nonvolatile memory device in accordance with embodiments of the inventive concept.

Referring to FIG. 8, a block management system 30 is arranged in nonvolatile memory device 20. Nonvolatile memory device 20 may be, e.g., a flash memory device, but it is not limited thereto. Where nonvolatile memory device 20 is a flash memory device, block management system 30 may be arranged in, e.g., a flash transition layer (FTL).

Host 10 provides a number of logical pages (LPN) to nonvolatile memory device 20. Host 10 may include a specific driver 15 for communication with block management system 30 of nonvolatile memory device 20.

Referring to FIG. 9, block management system 30 comprises a target block selecting module 31 and a block returning module 32. Target block selecting module 31 selects, as a target block of garbage collection, a full block whose block life exceeds a threshold among a number of full blocks in nonvolatile memory device 20 (i.e., old block). That is, as described above, target block selecting module 31 does not select, as a target block of garbage collection, a block whose block life does not exceed a threshold among the full blocks (i.e., young block). To this end, target block selecting module 31 manages a block life table for all full blocks in nonvolatile memory device 20. FIG. 10 illustrates an example of such a block life table.

Referring to FIG. 10, target block selecting module 31 comprises a block life table for all full blocks. In the block life table, full blocks whose block life does not exceed the threshold are classified as young blocks, and full blocks whose block life exceeds the threshold are classified as old blocks.

As described above, the threshold of the block life may be determined according to various alternative parameters, such as the average write distance of the logical pages written in nonvolatile memory device 20 and the amount of free blocks in nonvolatile memory device 20.

Block returning module 32 returns the target block selected by target block selecting module 31 as a free block.

In some embodiments of the inventive concept, block management system 30 selects the target block of garbage collection by directly managing a young block list. A more detailed description thereof is provided below with reference to FIG. 11.

Figure 11:
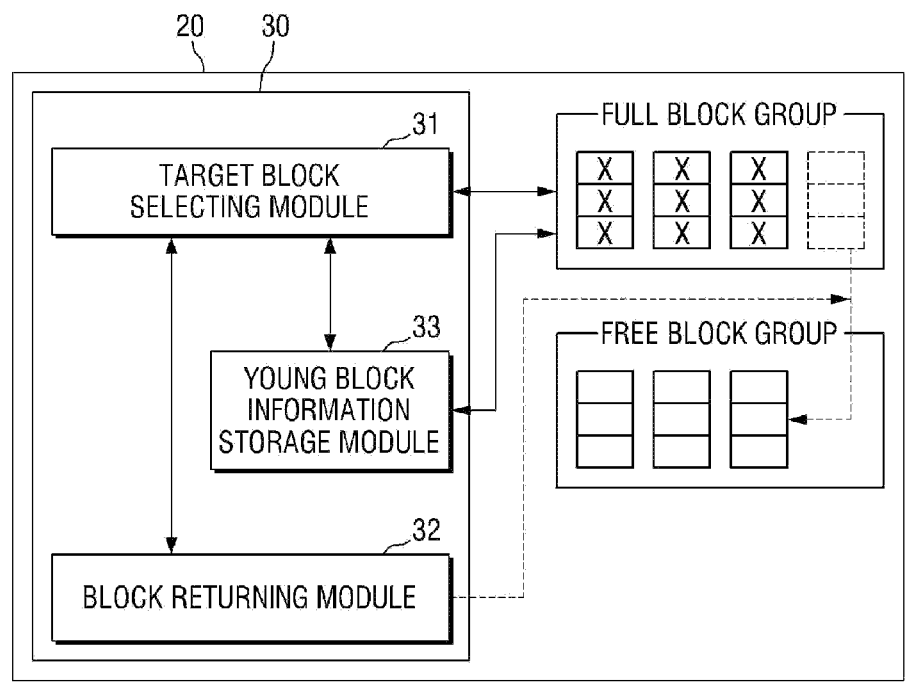
FIG. 11 is a diagram of a block management system for a nonvolatile memory device according to another embodiment of the inventive concept.

FIG. 11 is a diagram for explaining a variation of block management system 30 of nonvolatile memory device 20 according to another embodiment of the inventive concept.

Referring to FIG. 11, block management system 30 further comprises a young block information storage module 33 storing information regarding young blocks in nonvolatile memory device 20. Target block selecting module 31 is provided with information regarding young blocks from young block information storage module 33, and it extracts old blocks from among a number of full blocks in nonvolatile memory device 20 based on the information regarding young blocks. Then, target block selecting module 31 selects the target block of garbage collection from among the extracted old blocks.

Young block information storage module 33 can use various alternative methods to manage a young block list. For example, it may manage young blocks using a least recently used (LRU) list, a hash function, or other data structure.

Figure 12:
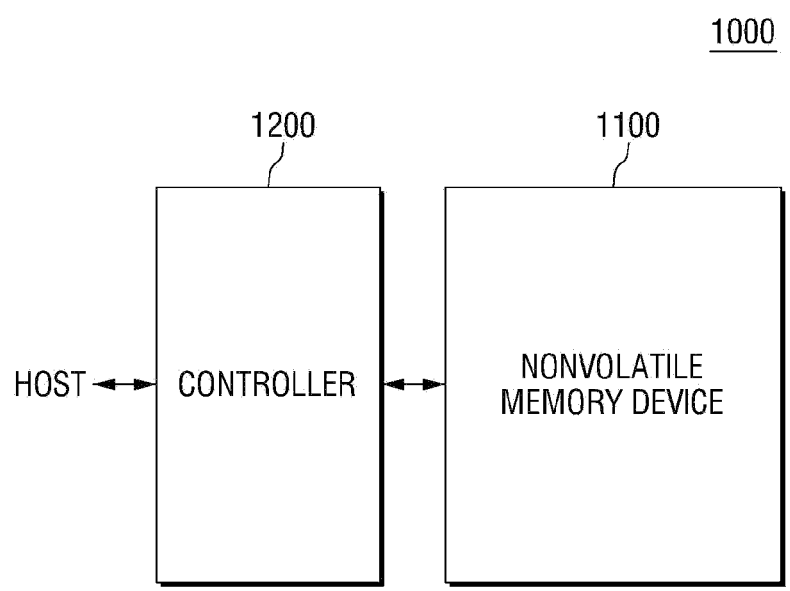
FIG. 12 is a block diagram of a memory system according to an embodiment of the inventive concept.
Figure 13:
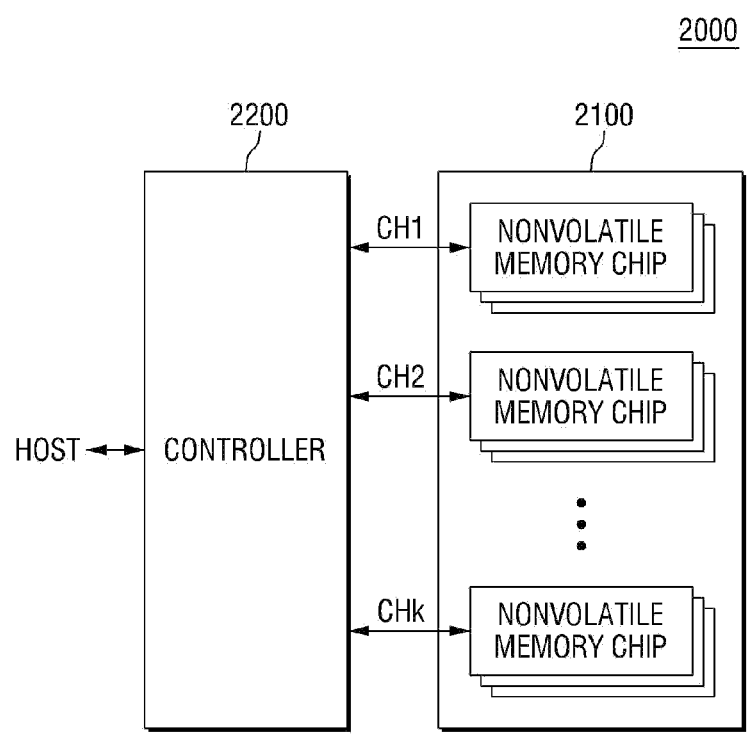
FIG. 13 is a block diagram of a memory system according to another embodiment of the inventive concept.
Figure 14:
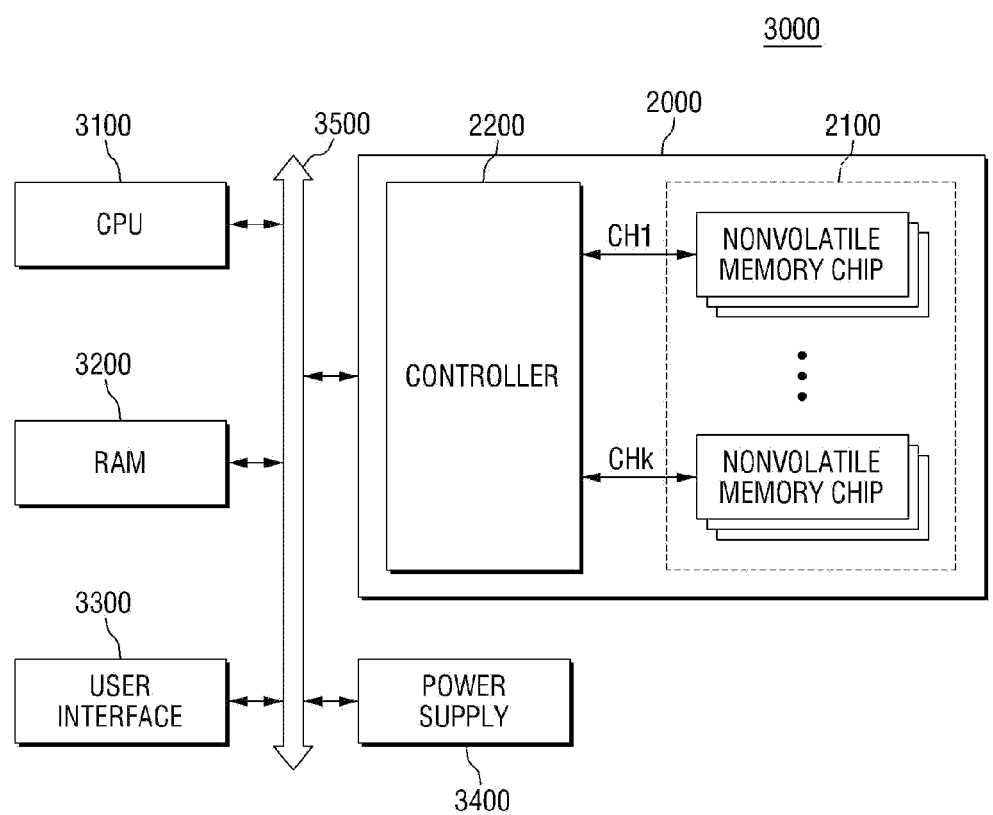
FIG. 14 is a block diagram of a computing system incorporating the memory system of FIG. 13 according to an embodiment of the inventive concept.

FIG. 12 is a block diagram of a memory system according to an embodiment of the inventive concept. FIG. 13 is a block diagram of a memory system according to another embodiment of the inventive concept. FIG. 14 is a block diagram of a computing system incorporating the memory system of FIG. 13.

Referring to FIG. 12, a memory system 1000 comprises a nonvolatile memory device 1100 and a controller 1200.

Nonvolatile memory device 1100 may be a nonvolatile memory device in which block management is performed as described above in relation to one or more of FIGS. 1-11.

Controller 1200 is connected to a host and nonvolatile memory device 1100. In response to the request of the host, controller 1200 accesses nonvolatile memory device 1100. For example, controller 1200 is configured to control the read, write, erase and background operations of nonvolatile memory device 1100. Controller 1200 is also configured to provide an interface between nonvolatile memory device 1100 and the host. Controller 1200 is configured to operate a firmware for controlling nonvolatile memory device 1100.

Controller 1200 may further comprise other components such as a random access memory (RAM), a processing unit, a host interface, and a memory interface. The RAM is used as at least one of an operation memory of the processing unit, a cache memory between nonvolatile memory device 1100 and the host, and a buffer memory between nonvolatile memory device 1100 and the host. The processing unit controls all operations of controller 1200.

The host interface typically implements a protocol for performing data exchange between hose and controller 1200. For example, controller 1200 is typically configured to perform communication with the host through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol. The memory interface interfaces with nonvolatile memory device 1100. For example, the memory interface may comprise a NAND interface or NOR interface.

Memory system 1000 may be configured to additionally include an error correction block. The error correction block is configured to detect and correct an error in data read from nonvolatile memory device 1100 using an error correction code (ECC). As an example, the error correction block may be provided as a component of controller 1200, or as a component of nonvolatile memory device 1100.

In some embodiments, controller 1200 and nonvolatile memory device 1100 are integrated in a single semiconductor device. For example, controller 1200 and nonvolatile memory device 1100 may be integrated as one semiconductor device to constitute a memory card, such as a PC card, a compact flash card (CF), a smart media card (SM, SMC), a memory stick, a multimedia card (MMC, RS-MMC, MMCmicro), a SD card (SD, miniSD, microSD, SDHC), a universal flash storage device (UFS), and the like.

As another example, controller 1200 and nonvolatile memory device 1100 may be integrated in one semiconductor device to form a solid state drive (SSD). Where memory system 1000 is used as the SSD, an operation speed of the host connected to memory system 1000 may be improved significantly.

Memory system 1000 may be provided as one of various components of an electronic apparatus such as a computer, ultra mobile PC (UMPC), workstation, net-book, personal digital assistants (PDA), portable computer, web tablet, wireless phone, mobile phone, smart phone, e-book, portable multimedia player (PMP), portable game console, navigation device, black box, digital camera, 3-dimensional television, digital audio recorder, digital audio player, digital picture recorder, digital picture player, digital video recorder, digital video player, apparatus capable of transmitting and receiving information in wireless environment, one of various electronic apparatuses constituting the home network, one of various electronic apparatuses constituting the computer network, one of various electronic apparatuses constituting the telematics network, RFID device, and one of various components forming the computing system.

Nonvolatile memory device 1100 or memory system 1000 may be mounted in various types of packages or package configurations. For example, nonvolatile memory device 1100 or memory system 1000 may be mounted in configurations such as package on package (PoP), ball grid arrays (BGAs), chip scale packages (CSPs), plastic leaded chip carrier (PLCC), plastic dual in line package (PDIP), die in waffle pack, die in wafer form, chip on board (COB), ceramic dual in line package (CERDIP), plastic metric quad flat pack (MQFP), thin quad flat pack (TQFP), small outline (SOIC), shrink small outline package (SSOP), thin small outline (TSOP), thin quad flat pack (TQFP), system in package (SIP), multi chip package (MCP), wafer-level fabricated package (WFP), wafer-level processed stack package (WSP).

Referring to FIG. 13, a memory system 2000 comprises a nonvolatile memory device 2100 and a controller 2200. Nonvolatile memory device 2100 comprises a plurality of nonvolatile memory chips. The nonvolatile memory chips are divided into a plurality of groups, where each group is configured to perform communication with controller 2200 via a common channel. For example, the nonvolatile memory chips may perform communication with controller 2200 via first to k-th channels CH1 to CHk. In some embodiments, memory system 2000 may be modified such that one nonvolatile memory chip is connected to one channel.

Referring to FIG. 14, a computing system 3000 comprises a central processing unit 3100, a random access memory (RAM) 3200, a user interface 3300, a power supply 3400, and memory system 2000.

Memory system 2000 is electrically connected to central processing unit 3100, RAM 3200, user interface 3300 and power supply 3400 via a system bus 3500. The data provided through user interface 3300 or processed by central processing unit 3100 is stored in memory system 2000.

Although FIG. 14 shows an example where nonvolatile memory device 2100 is connected to system bus 3500 through controller 2200, nonvolatile memory device 2100 may alternatively be configured to be directly connected to system bus 3500. Moreover, although FIG. 14 shows an example using memory system 2000, in some alternative embodiments, memory system 2000 may be replaced by memory system 1000. In still other alternatives, computing system 3000 may be configured to both of memory systems 1000 and 2000.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A method of managing memory blocks in a nonvolatile memory device, the method comprising:

identifying a full memory block among a plurality of memory blocks in the nonvolatile memory device;

determining whether a block life of the full memory block exceeds a threshold value; and upon determining that the block life of the full memory block exceeds the threshold value, selecting the full memory block as a target block for garbage collection, wherein the threshold of the block life is determined using an average write distance of logical pages programmed in the nonvolatile memory device, wherein the write distance denotes an amount of the logical pages programmed in the nonvolatile memory device between a time when a specific logical page is programmed in a first location of the nonvolatile memory device and a time when the specific logical page is again programmed in a second location of the nonvolatile memory device, the second location being different from the first location.

2. The method of claim 1, further comprising returning the target block as a free block.

3. The method of claim 1, further comprising invalidating all pages of the target block and erasing the target memory block.

4. The method of claim 1, wherein the threshold of the block life is changed according to logical pages provided to the nonvolatile memory device.

5. The method of claim 1, wherein the determining the threshold of the block life comprises:

selecting a subset of logical pages among the logical pages written in the nonvolatile memory device; and considering an average of write distances of the subset of logical pages.

6. The method of claim 5, wherein a minimum threshold of the block life is calculated according to an equation:

Minimum threshold of block life =Average of write distances of sample logical pages * (1+k), where 0≤k <1 and k is a real number.

7. The method of claim 6, wherein a maximum threshold of the block life is determined based on a number of free blocks in the nonvolatile memory device.

8. The method of claim 1, wherein the threshold of the block life is fixed regardless of logical pages provided to the nonvolatile memory device.

9. The method of claim 8, wherein the threshold of the block life is determined according to a number of free blocks in the nonvolatile memory device.

10. The method of claim 1, wherein the nonvolatile memory device comprises a flash memory device.

11. A system for managing memory blocks in a nonvolatile memory device, the system comprising:

a target block selecting module disposed in the nonvolatile memory device, and that selects, as a target block for garbage collection, a full block having a block life greater than a threshold; and a block returning module disposed in the nonvolatile memory device, and that returns the target block selected by the target block selecting module as a free block, wherein the threshold of the block life is determined using an average write distance of logical pages programmed in the nonvolatile memory device, wherein the write distance denotes an amount of the logical pages programmed in the nonvolatile memory device between a time when a specific logical page is programmed in a first location of the nonvolatile memory device and a time when the specific logical page is again programmed in a second location of the nonvolatile memory device.

12. The system of claim 11, further comprising a young block information storage module that stores information regarding young blocks in the nonvolatile memory device, wherein the target block selecting module receives the information regarding young blocks from the young block information storage module, identifies old blocks among full blocks in the nonvolatile memory device based on the information regarding young blocks, and selects the target block among the identified old blocks.

13. The system of claim 12, wherein the young block information storage module manages the young blocks using a least recently used (LRU) list.

14. The system of claim 11, wherein the target block selecting module manages a block life table for full blocks in the nonvolatile memory device.

15. The system of claim 11, wherein the threshold of the block life is determined based on an average write distance of logical pages written in the nonvolatile memory device and a number of free blocks in the nonvolatile memory device.

16. The system of claim 11, wherein the target block selecting module and the block returning module are located in the nonvolatile memory device.

17. A method of managing memory blocks in a nonvolatile memory device, the method comprising:

determining whether a memory block is a block that stores a maximum number of logical pages and whether the memory block is an old block; and selecting the memory block as a target block for garbage collection in consideration of a block life of the memory block and a number of pages stored in the memory block, wherein the threshold of the block life is determined using an average write distance of logical pages programmed in the nonvolatile memory device, wherein the write distance denotes an amount of the logical pages programmed in the nonvolatile memory device between a time when a specific logical page is programmed in the nonvolatile memory device and a time when the specific logical page is again programmed in the nonvolatile memory device.

18. The method of claim 17, wherein the memory block is determined to be an old block if a predetermined number of logical pages have been written to the nonvolatile memory device since the memory block became a full block.

* * * * *